US012003273B2

(12) United States Patent
Jadidian et al.

(10) Patent No.: US 12,003,273 B2
(45) Date of Patent: Jun. 4, 2024

(54) SECURE ELEMENT AUTHENTICATION USING OVER THE AIR OPTICAL COMMUNICATION

(71) Applicant: Microsoft Technology Licensing, LLC, Redmond, WA (US)

(72) Inventors: Jouya Jadidian, Los Gatos, CA (US); Mohit Narang, Cupertino, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 17/556,807

(22) Filed: Dec. 20, 2021

(65) Prior Publication Data

US 2023/0198619 A1 Jun. 22, 2023

(51) Int. Cl.
| H04B 10/11 | (2013.01) |
| G06F 3/01 | (2006.01) |
| G06V 40/16 | (2022.01) |
| G06V 40/18 | (2022.01) |
| G06V 40/19 | (2022.01) |
| H04B 10/116 | (2013.01) |
| H04L 9/40 | (2022.01) |

(52) U.S. Cl.
CPC ............ *H04B 10/116* (2013.01); *G06F 3/011* (2013.01); *G06V 40/161* (2022.01); *G06V 40/19* (2022.01); *G06V 40/197* (2022.01); *H04B 10/11* (2013.01); *H04L 63/0861* (2013.01)

(58) Field of Classification Search
CPC ............... H04J 14/0212; H04J 14/0268; H04J 2203/0055; H04J 14/0267; H04J 14/0227
See application file for complete search history.

(56) References Cited

U.S. PATENT DOCUMENTS

| 9,369,200 B1 * | 6/2016 | Schmidtke | ........... H04B 10/038 |
| 9,369,785 B1 * | 6/2016 | Schmidtke | .............. H04L 45/42 |
| 10,097,263 B2 * | 10/2018 | Shiner | ..................... H04L 67/55 |

(Continued)

FOREIGN PATENT DOCUMENTS

| WO | WO-2015124770 A1 * | 8/2015 | ............. G06F 21/32 |
| WO | 2020240016 A1 | 12/2020 | |

OTHER PUBLICATIONS

"International Search Report and Written Opinion Issued in PCT Application No. PCT/US2022/037527", dated Oct. 28, 2022, 15 Pages.

*Primary Examiner* — Tanya T Motsinger
(74) *Attorney, Agent, or Firm* — Workman Nydegger

(57) ABSTRACT

A system for facilitating secure communications accesses a secure element in response to determining that an authorized user operates the system. The system causes a light emitter to emit an output light signal for detection by a second system. The output light signal is emitted according to a predefined field of view, which operates as a constraint to prevent devices outside of the field of view from detecting the output light signal. The system also configures the light detector to detect a second output light signal emitted by a second light emitter of the second system. In response to (i) detection of the output light signal by a second light detector of the second system and (ii) detection of the second output light signal by the light detector, the system enables secure communication between the system and the second system.

15 Claims, 11 Drawing Sheets

(56) References Cited

U.S. PATENT DOCUMENTS

| | | | |
|---|---|---|---|
| 10,256,935 B1* | 4/2019 | Kumar | H04L 1/0003 |
| 10,727,973 B1* | 7/2020 | Kumar | H04L 45/64 |
| 10,998,970 B1* | 5/2021 | Passe | H04M 1/04 |
| 11,252,035 B2* | 2/2022 | Wang | H04L 41/0894 |
| 11,342,988 B2* | 5/2022 | Chhillar | H04J 14/0289 |
| 2001/0014167 A1* | 8/2001 | Gifford | G07C 9/37 |
| | | | 382/117 |
| 2004/0258415 A1* | 12/2004 | Boone | H04B 10/1125 |
| | | | 398/125 |
| 2014/0289875 A1* | 9/2014 | Knafel | G06F 21/6245 |
| | | | 726/33 |
| 2016/0085958 A1* | 3/2016 | Kang | G06F 21/40 |
| | | | 726/19 |
| 2017/0048221 A1* | 2/2017 | Melton | G06F 21/6245 |
| 2017/0255915 A1* | 9/2017 | Chandrasekaran | G06Q 20/20 |
| 2018/0150690 A1* | 5/2018 | Yin | A61B 3/0008 |
| 2018/0196528 A1* | 7/2018 | Patel | G06F 3/038 |
| 2018/0220210 A1* | 8/2018 | Paraschis | H04Q 11/0062 |
| 2018/0262293 A1* | 9/2018 | Ip | H04J 14/0212 |
| 2019/0007137 A1* | 1/2019 | Djordjevic | H04B 10/5161 |
| 2019/0340421 A1* | 11/2019 | Boenapalli | G06V 40/172 |
| 2019/0370450 A1 | 12/2019 | Fletcher et al. | |
| 2021/0352385 A1* | 11/2021 | Thollabandi | H04J 14/0238 |
| 2022/0014945 A1* | 1/2022 | Patel | H04L 45/24 |
| 2022/0294610 A1* | 9/2022 | Sabbu | H04L 9/0825 |
| 2022/0417249 A1* | 12/2022 | Klapman | H04L 9/3231 |
| 2023/0098097 A1* | 3/2023 | Vaid | G06F 21/6209 |
| | | | 726/1 |

* cited by examiner

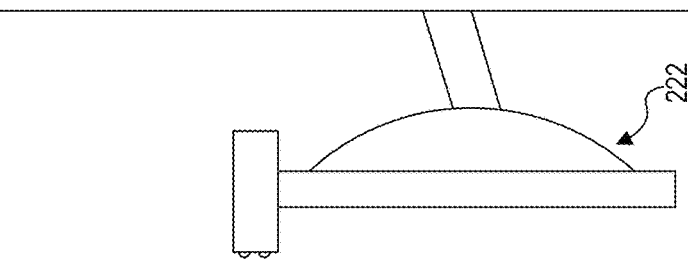
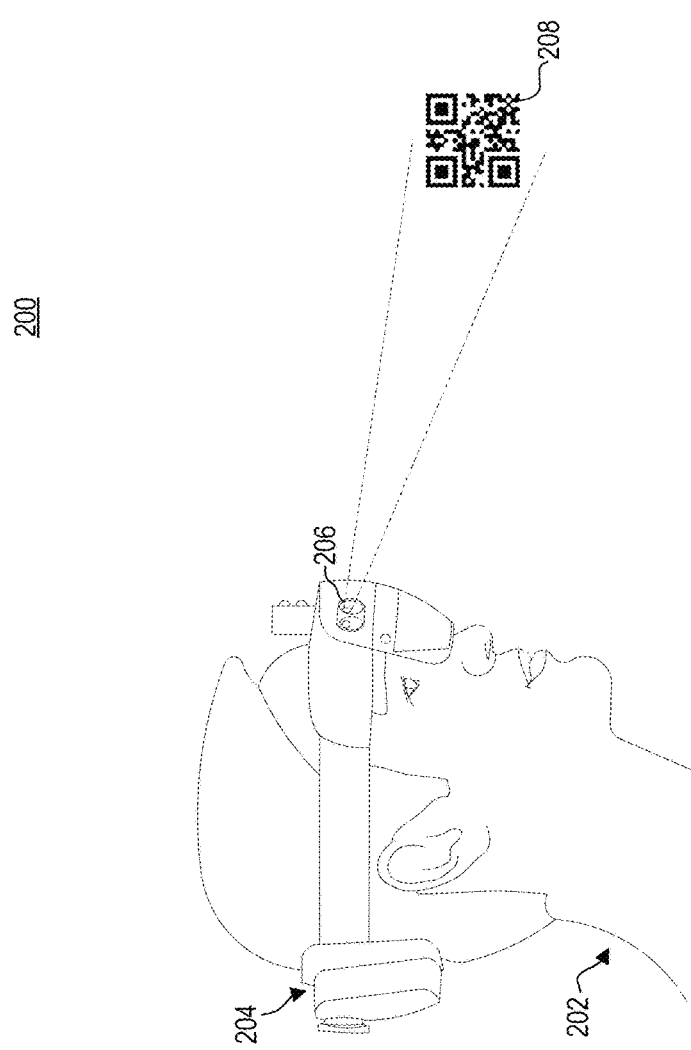
FIG. 2A

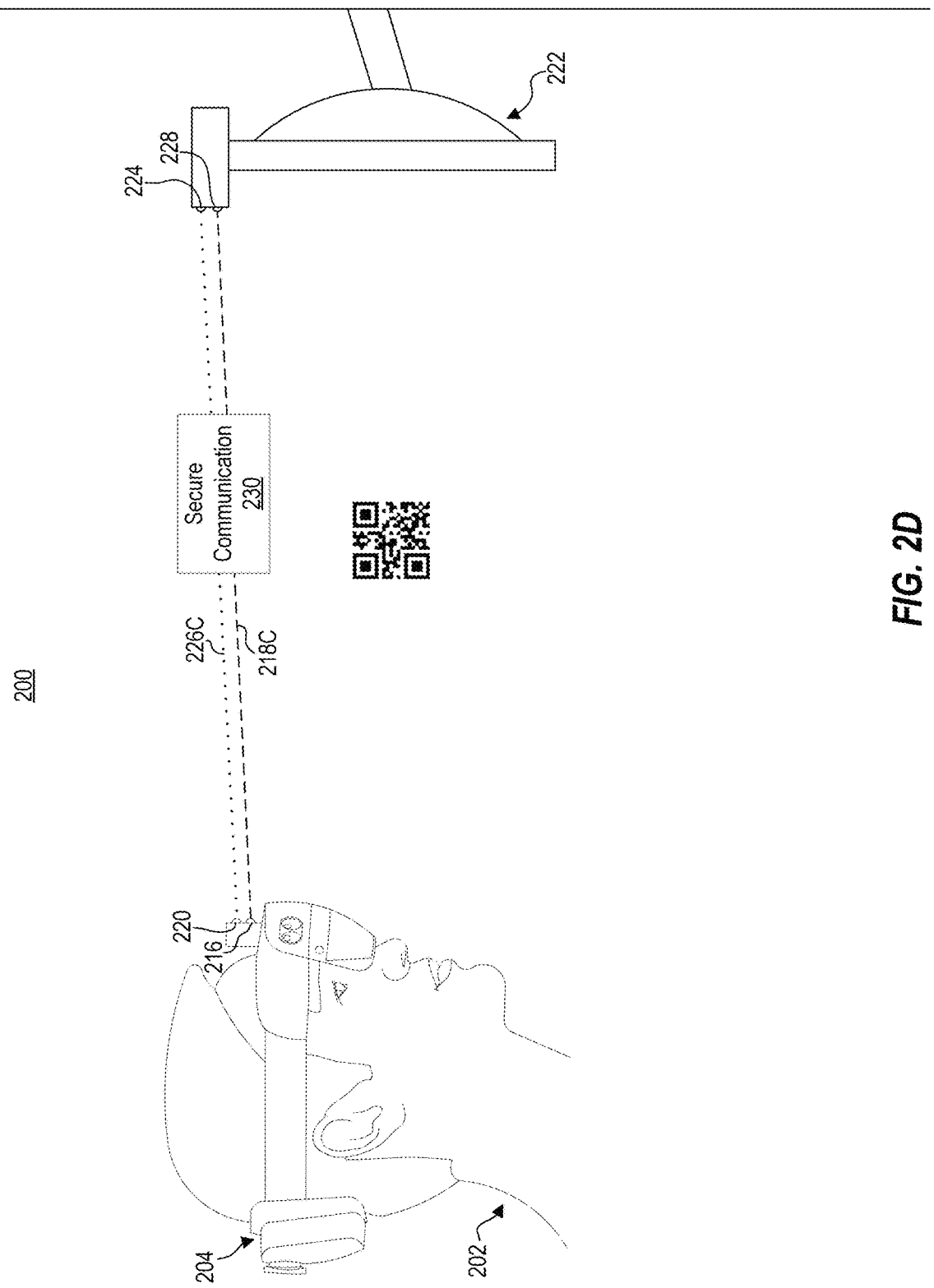

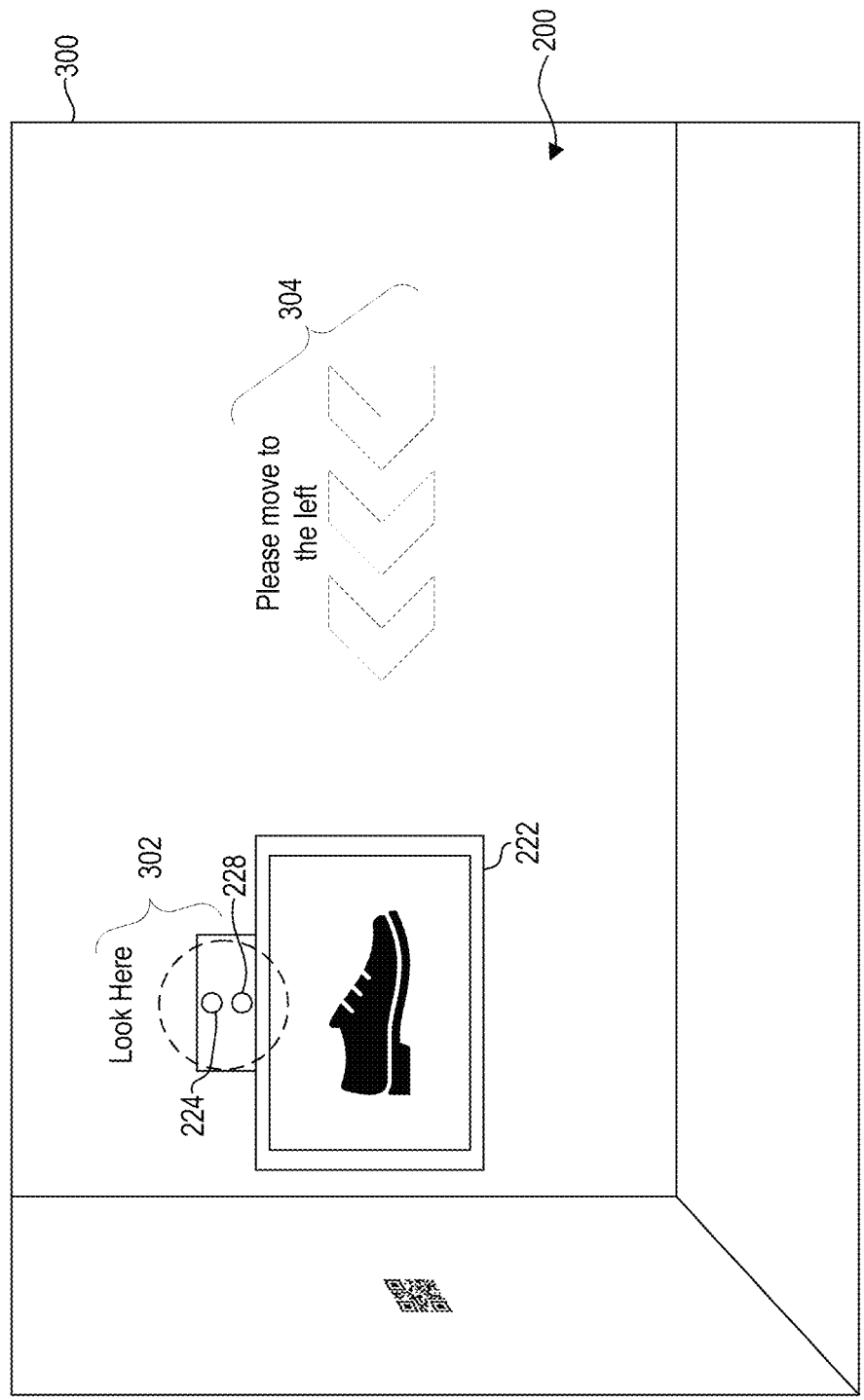

800

SECURE ELEMENT AUTHENTICATION USING OVER THE AIR OPTICAL COMMUNICATION

BACKGROUND

Many devices utilize near field communication (NFC) to facilitate authenticated transactions between devices. For example, a user may configure a user device to be able to make payments to vendors, such as by securely onboarding credit card information (or information associated with another payment mode) onto the device. The user device may then utilize NFC when brought sufficiently close to an NFC-enabled terminal to facilitate a secure payment. To improve transactional security, NFC payment implementations (or other NFC transactions) may require confirmation or validation by prompting users to provide authenticating input (e.g., password input).

NFC between devices is typically only possible when the devices are within close proximity to one another, such as within centimeters or millimeters to one another. Accordingly, while NFC may be suitable to facilitate secure transactions for certain types of devices, such as smartphones, many obstacles impede the implementation of NFC for secure transactions on other types of devices. For example, head-mounted displays (HMDs), which are often configured to display extended reality content (e.g., augmented reality, virtual reality, mixed reality, etc.), are becoming increasingly pervasive as general-purpose mobile computing devices. However, to facilitate NFC transactions using HMDs, a user would need to position their head proximate to an NFC-enabled terminal. Such implementations would lead to user hesitancy (e.g., due to awkwardness) and potential safety concerns.

Accordingly, there exists a substantial need for improved secure transaction systems and techniques for mobile devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed at least to systems, methods, and devices for secure element authentication using over the air optical communication.

Some embodiments include a system configured to facilitate secure communications. The system may comprise a light emitter, a detector, one or more processors, and one or more hardware storage devices storing instructions that are executable by the one or more processors to configure the system to perform various acts. In some instances, the system is configurable to access a secure element in response to determining that an authorized user operates the system and cause the light emitter to emit an output light signal for detection by a second system. The output light signal is emitted according to a predefined field of view, and the predefined field of view operates as a constraint to prevent devices outside of the field of view from detecting the output light signal. The system is also configurable to configure the light detector to detect a second output light signal emitted by a second light emitter of the second system. The system is further configurable to, in response to (i) detection of the output light signal by a second light detector of the second system and (ii) detection of the second output light signal by the light detector, enable secure communication between the system and the second system.

Some embodiments provide a head-mounted display (HMD) that includes one or more iris recognition sensors, one or more wireless communication devices, one or more processors, and one or more hardware storage devices storing instructions that are executable by the one or more processors to configure the system to perform various acts. In some instances, the system is configurable to perform iris recognition utilizing the one or more iris recognition sensors to verify that an authorized user is operating the system. The system is further configurable to, based upon determining that the authorized user is operating the system based upon the iris recognition, emit a signal for detection by one or more second devices utilizing the one or more wireless communication devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2A illustrates an example of a triggering event for initiating a communication or transaction between a head-mounted display (HMD) and another device;

FIGS. 2C and 2D illustrate examples of light being emitted from the HMD and another device to facilitate secure communication therebetween;

FIG. 3 illustrates an example of guidance provided to a user to bring optical communication components of an HMD into alignment with optical communication components of another device;

DETAILED DESCRIPTION

Figure 1:
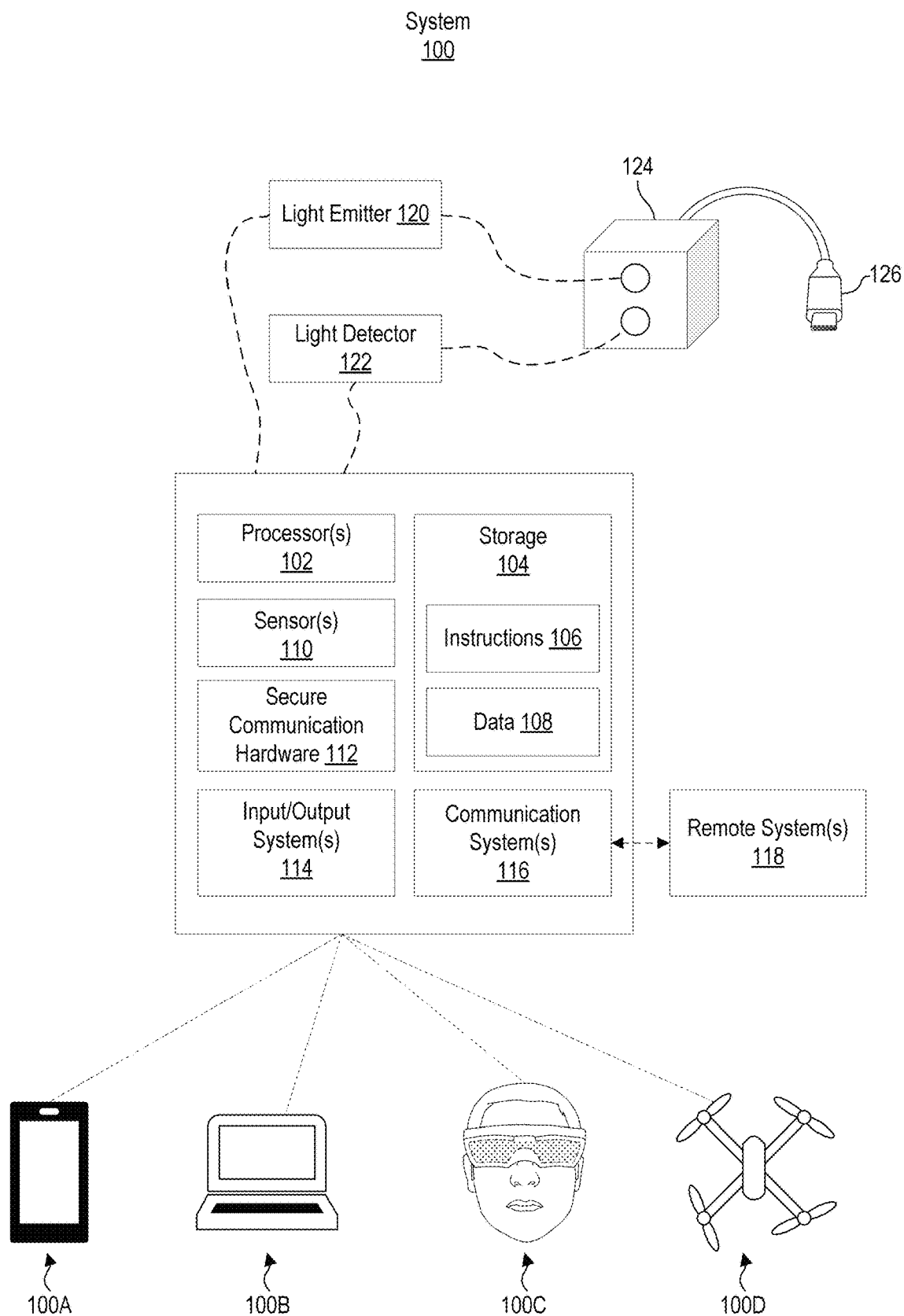
FIG. 1 illustrates example components of an example system that may include or be used to implement one or more disclosed embodiments.

Disclosed embodiments are generally directed to systems, methods, and devices that facilitate secure over the air optical communications.

Examples of Technical Benefits, Improvements, and Practical Applications

Those skilled in the art will recognize, in view of the present disclosure, that at least some of the disclosed embodiments may be implemented to address various shortcomings associated with at least some conventional techniques facilitating secure inter-device communications. The following section outlines some example improvements and/or practical applications provided by the disclosed embodiments. It will be appreciated, however, that the following are examples only and that the embodiments described herein are in no way limited to the example improvements discussed herein.

In accordance with the present disclosure, a system may facilitate secure inter-device communication by accessing a secure element in response to determining that an authorized user operates the system. The system causes a light emitter thereof to emit an output signal for detection by another device. The system configures a light detector thereof to detect another output signal emitted by the other device. In response to the other device detecting the output signal of the system, and in response to the system detecting the other output signal of the other device, authenticated communication may be enabled between the system and the other device. The authenticated communication may advantageously be unidirectional or bidirectional.

Access to the secure element may be enabled in various manners, such as via iris recognition (e.g., using an HMD), face recognition, fingerprint recognition, password/pin entry, and/or other approaches. The over the air optical communication discussed above (e.g., using the light emitter and the light detector) may be implemented using hardware integrated into the system or by connecting an external device (e.g., an optical communication dongle with a connector element, such as a USB-C or other type of connector) to the system that includes the necessary hardware. Thus, the disclosed techniques may advantageously be implemented on devices that already exist in commerce.

The device components discussed herein may be implemented on mobile devices and/or static devices to facilitate communication between any types of devices in various scenarios (e.g., payment, peer-to-peer communication, internet access communications, security device communications (e.g., doors, vehicles), and/or others). The disclosed techniques for over the air optical communication may be implemented in a low-power manner (e.g., utilizing a dedicated low-power always-on processor, utilizing power within a range of about 50 mW to about 200 mW), which may enable such communication independently of the device operating system.

In contrast with emerging optical communication technologies, which attempt to remove the directionality constraints associated with focused light-based communications, the disclosed embodiments implement directionality constraints as a feature to prevent devices outside of a predetermined line of sight or field of view from being able to detect the communications. In this regard, the disclosed communication techniques may be physically security against outside attempts to receive secure communications (e.g., attempts to "sniff" inter-device communications), especially when combined with the use of a secure element as described herein.

In accordance with the present disclosure, utilizing a secure element via iris recognition on an HMD may be combined with other types of wireless communication technologies (e.g., in addition to or instead of over the air optical communication (e.g., LiFi)). For instance, radio-based communication (e.g., ultra-wideband (UWB), WiFi, cellular, and/or others) may be utilized in combination with secure element information accessed via iris recognition to facilitate secure inter-device communication. Thus, devices may advantageously be configured to facilitate secure communications using multiple communication modalities (e.g., optical-based and radio-based), which may contribute to interoperability of devices and rapid implementation of the disclosed embodiments in emerging devices and in commerce (and other fields of endeavor).

Having just described some of the various high-level features and benefits of the disclosed embodiments, attention will now be directed to FIGS. 1 through 8. These Figures illustrate various conceptual representations, architectures, methods, and supporting illustrations related to the disclosed embodiments.

Example Systems and Techniques for Secure Over the Air Optical Communication FIG. 1 illustrates various example components of a system 100 that may be used to implement one or more disclosed embodiments. For example, FIG. 1 illustrates that a system 100 may include processor(s) 102, storage 104, sensor(s) 110, secure communication hardware 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, inertial measurement units (IMUs) and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

Secure communication hardware 112 may comprise any hardware element(s) (e.g., one or more dedicated microprocessors or microcontrollers, secure access modules, etc.) configured to improve security of transactions performed or enabled by the system 100. For example, secure communication hardware 112 may comprise one or more secure elements, which can store (or facilitate storage of and/or access to) sensitive data (e.g., passwords, financial information, payment information, etc.) and/or run secure applications (e.g., payment applications). Secure communication hardware 112 may additional or alternatively comprise hardware for implementing dynamic security codes for transactions performed using the system 100. For example, time-specific security codes may be implemented to accompany transactions in order for the transactions to be considered valid, and the security codes may be configured to frequently changed (e.g., or dynamically generated or obtained) in order to prevent transactions from being considered valid in the absence of the system 100 (e.g., thereby combatting "card-not-present" or "device not present" transactions). An example secure communication hardware 112 may comprise one or more NXP SR100 products, NXP Smart MX products, and/or others.

FIG. 1 furthermore illustrates that a system may comprise a light emitter 120 and a light detector 122, which, as will be described in more detail hereinafter, may be utilized to facilitate optical over the air communication (e.g., LiFi) between the system 100 and one or more other devices (e.g., by generating modulated light signals). The light emitter 120 may take on various forms, such as one or more light emitting diodes (LEDs), vertical-cavity surface emitting lasers (VCSELs), corresponding drivers (e.g., a VCSEL driver) and/or others. The light emitter 120 may furthermore comprise one or more optical elements (e.g., collimating optics) to direct the light emitted from the light emitter 120 according to a predefined field of view or solid angle. The light detector 122 may comprise one or more hardware elements configured to generate a current based on detected light (e.g., one or more photodiodes) and generate a voltage signal (e.g., a digital signal) based on the current (e.g., one or more transimpedance amplifiers).

In some instances, the system 100 includes a device into which at least some of the components of FIG. 1 are integrated. For instance, FIG. 1 shows that the system 100 may comprise or utilize a mobile electronic device 100A (e.g., a smartphone), a personal computing device 100B (e.g., a laptop), a mixed-reality head-mounted display 100C (HMD 100C), an aerial vehicle 100D (e.g., a drone), and/or other devices. In some instances, one or more components of the system 100, such as the light emitter 120 and/or the light detector 122, are integrated into an external communication device, such as the dongle 124 illustrated in FIG. 1.

The dongle 124 may comprise the light emitter 120, the light detector 122, and/or other components. Any components of FIG. 1, including secure communication hardware 112, may be additionally or alternatively implemented on the dongle 124. The dongle may comprise a connector element 126 (e.g., a USB-C connector or other type of connector) to facilitate connection of the dongle 124 to various types of devices (e.g., devices that lack a light emitter 120 and/or light detector 122 in accordance with the present disclosure. Accordingly, in some instances, at least some techniques of the present disclosure may be implemented on devices that already exist in commerce via a dongle 124.

The particular shape, size, and/or relative arrangement of elements of the dongle 124 shown in FIG. 1 is/are provided by way of example only and are not limiting of the present disclosure, and different dongles may be tailored for connection to different user devices. For instance, a dongle 124 configured to connect to an HMD may comprise an elongated form factor and may include mounting elements that allow the dongle to mount to the HMD such that the light emitter 120 and the light detector 122 thereof are aligned with the user field of view of the HMD (e.g., see FIG. 2C). In contrast, a dongle 124 configured to connect to a smartphone or other handheld electronic device may comprise a small form factor (e.g., a 1 cm×1 cm×1 cm cube).

Although the present description focuses, in at least some respects, on utilizing an HMD to implement techniques of the present disclosure, additional or alternative types of systems may be used.

FIG. 2A illustrates an example of a triggering event for initiating a communication or transaction between a head-mounted display (HMD) 204 and another device. In particular, FIG. 2A illustrates a user 202 operating an HMD 204 within an operational environment 200. The operational environment 200 of FIG. 2A includes a separate device 222 which the user 202 may desire to interact with (e.g., via the HMD 204) to facilitate a communication or transaction (e.g., to make a payment to purchase a product or service, to provide security authentication, to provide or initiate peer-to-peer communication, etc.).

In the example of FIG. 2A, the separate device 222 comprises an interactive payment terminal, and the device operated by the user 202 is an HMD 204. However, it will be appreciated, in view of the present disclosure, a user may operate any type of device to facilitate communication/transaction with any type of device (e.g., HMD to HMD, HMD to non-HMD).

In some instances, to initiate an inter-device transaction in accordance with the present disclosure, a system (e.g., HMD 204) detects communication initiation input, which may take on various forms, such as user input provided at an application or website, user voice or gesture input, and/or others. In the example of FIG. 2A, the communication initiation input takes the form of scanning a scannable element. For instance, FIG. 2A shows that the HMD 204 includes one or more cameras 206, which may be utilized to scan a quick response code 208 (QR code 208) that is operable, when scanned, to cause the HMD 204 to initiate a communication or transaction with another device (e.g., a predefined device, such as the separate device 222, according to an endpoint associated with the QR code).

Figure 2B:
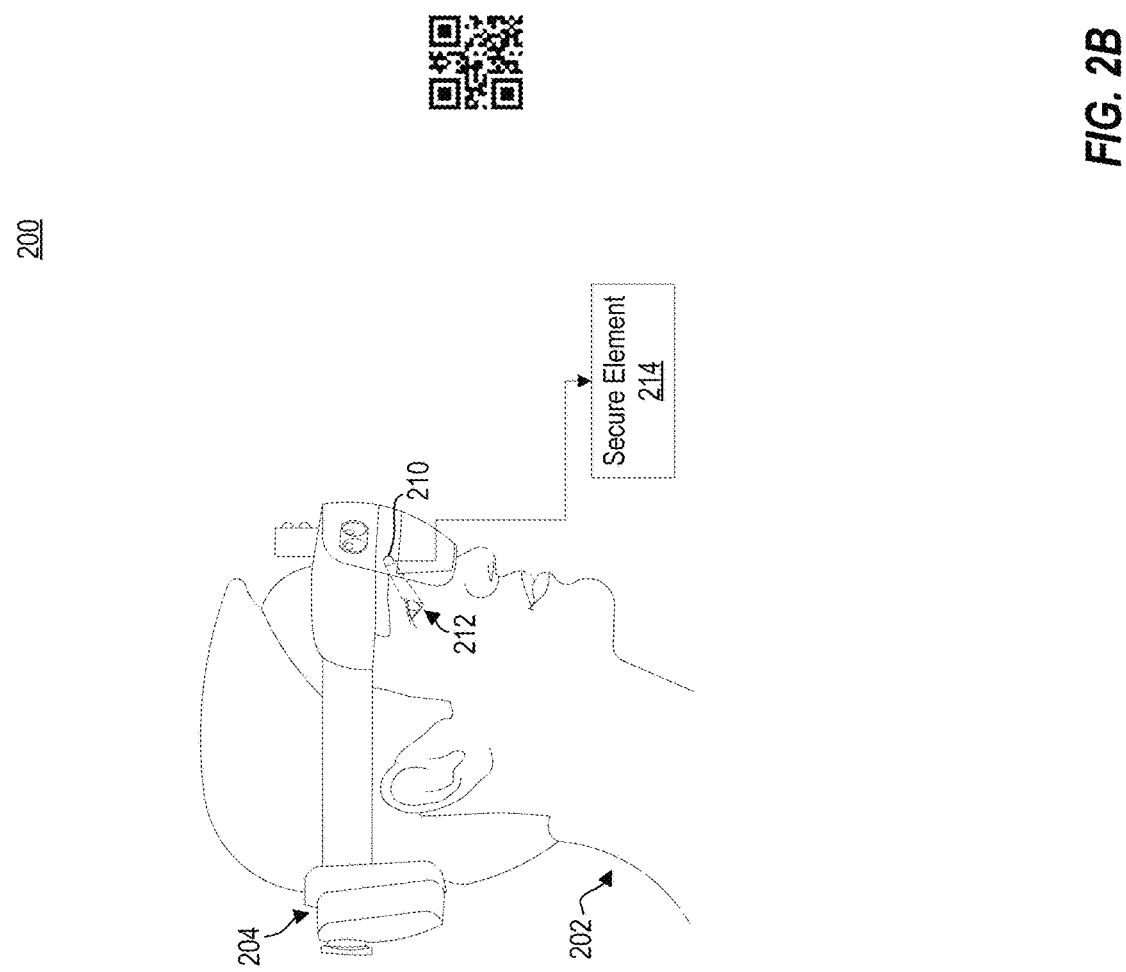
FIG. 2B illustrates an example of accessing a secure element associated with the HMD.

In some instances, the communication or transaction between the HMD 204 of the user 202 relies on information stored in or accessed via a secure element 214. In some instances, a secure element is accessed via iris recognition. FIG. 2B illustrates an example of accessing a secure element 214 associated with the HMD 204. The iris recognition may indicate that an authorized user (e.g., user 202) is currently operating the system (e.g., HMD 204), thereby enabling use of the secure element 214 (e.g., to facilitate payment) or access to information stored thereon. FIG. 2B shows that the HMD 204 may comprise one or more iris sensors 210 to enable the HMD 204 to perform iris detection. Iris recognition may comprise capturing a visible and/or near-infrared image of one or more eyes 212 of the user 202 to determine whether the captured image depicts an iris signature (e.g., based on the unique patterns in irises) associated with an authorized user of the HMD 204. The secure element 214 may be accessed in response to determining that the captured iris corresponds to an iris of an authorized user.

In some implementations, a secure element 214 may be accessed in response to other types of authentications, in addition or as an alternative to iris recognition as shown and described with reference to FIG. 2B. For instance, other authentications may include fingerprint recognition, facial recognition, password or pin entry, and/or others.

Accessing of the secure element 214 may be performed prior to or after detecting the communication initiation input as discussed hereinabove with reference to FIG. 2A.

Figure 2C:
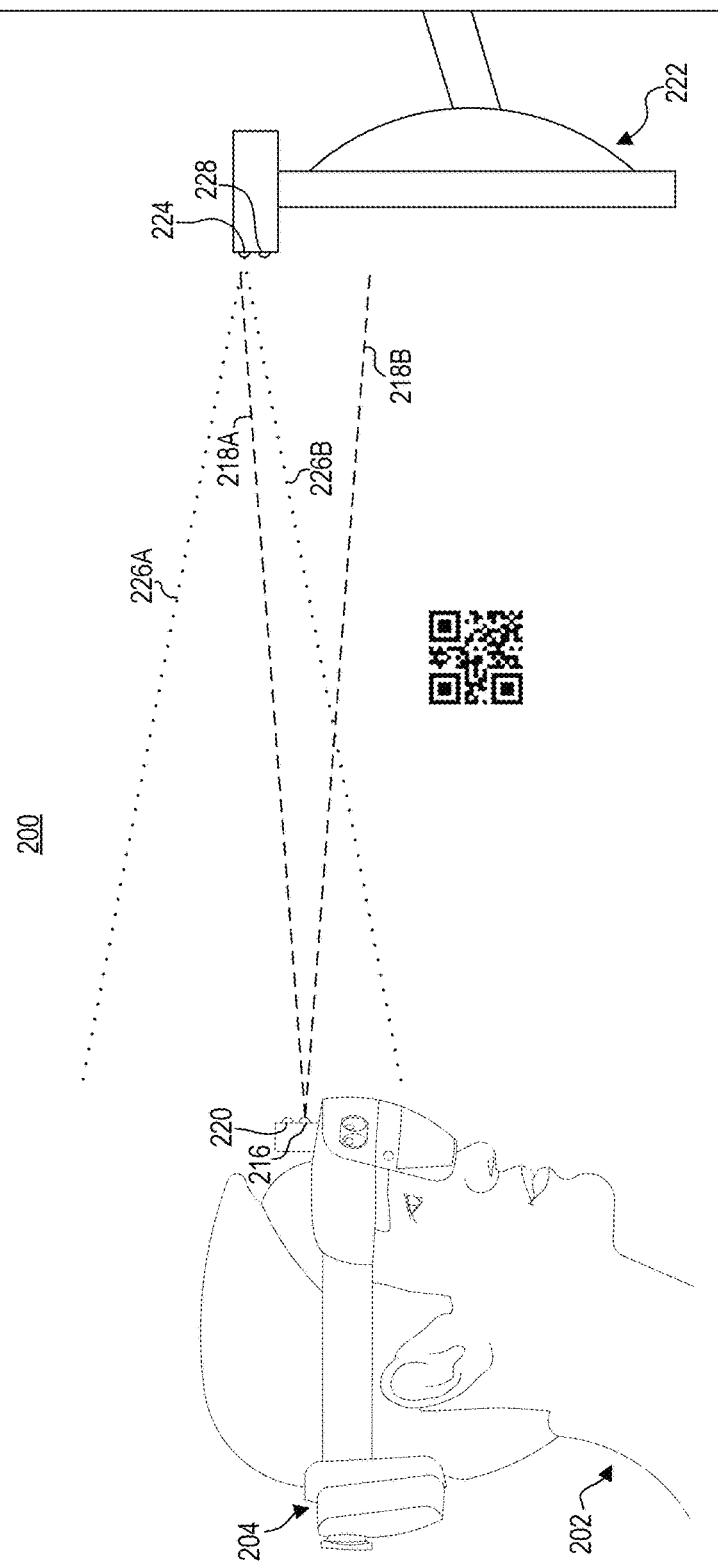

FIGS. 2C and 2D illustrate examples of light being emitted from the HMD 204 and the separate device 222 to facilitate secure communication therebetween. Light may be emitted from the HMD 204 and/or the separate device 222 prior to or after detecting the communication initiation input (e.g., the scanning of the QR code 208) and/or accessing the secure element 214 as discussed hereinabove with reference to FIG. 2B.

FIG. 2C illustrates the HMD 204 as including a light emitter 216, which may conceptually correspond to the light emitter 120 discussed above with reference to FIG. 1. In the example depicted in FIG. 2C, the light emitter 216 emits a light signal according to a predefined field of view (e.g., a predefined solid angle), denoted by dashed lines 218A and 218B in FIG. 2C. The field of view may comprise any suitable size such as 60 degrees, or greater than or less than 60 degrees (e.g., 30 degrees). The emitted light signal may comprise any wavelength or range of wavelengths of light (e.g., visible, infrared, etc.). In some embodiments, a wavelength of 850 nm infrared light is utilized, which may advantageously reduce the detectability of the light signal by devices outside of the field of view (e.g., the field of view bounded by dashed lines 218A and 218B in FIG. 2C).

FIG. 2C also illustrates the separate device 222 as including a light emitter 224, which may also conceptually correspond to the light emitter 120 discussed above with reference to FIG. 1. The light emitter 224 may also emit a light signal (e.g., a second light signal within the operational environment 200). The second light signal may be emitted from the light emitter 224 according to a predefined field of view, denoted by dotted lines 226A and 226B in FIG. 2C. Relative to the light signal associated with the light emitter 216 of the HMD 204, the field of view of the light signal emitted from the light emitter 224 may be larger (as shown in FIG. 2C), smaller, the same size, the same shape, a different shape, etc. Furthermore, the second light signal may comprise the same wavelength or range of wavelengths as the light signal emitted via the HMD 204, or may comprise a different wavelength or range of wavelengths.

FIG. 2C also shows that the HMD 204 may include a light detector 220, which may conceptually correspond to the light detector 122 discussed hereinabove with reference to FIG. 1. Similarly, FIG. 2C shows that the separate device 222 may comprise a light detector 228, which may also conceptually correspond to the light detector 122 discussed hereinabove with reference to FIG. 2C. The light detector 220 of the HMD 204 may be configured to detect the second light signal emitted by the light emitter 224 of the separate device 222 when the light detector 220 of the HMD 204 is positioned within the light emission field of view of the light emitter 224 of the separate device (e.g., shown in FIG. 2C by the dotted lines 226A and 226B). The light detector 228 of the separate device 222 may be configured to detect the light signal emitted by the light emitter 216 of the HMD 204 when the light detector 228 of the separate device 222 is positioned within the light emission field of view of the light emitter 216 of the HMD 204. The light detectors 220 and 228 may be configured to detect light signals prior to or after detecting the communication initiation input (e.g., the scanning of the QR code 208) and/or accessing the secure element 214 as discussed hereinabove with reference to FIG. 2B.

As will be described in more detail hereinafter, secure communication between the HMD 204 and the separate device 222 may become enabled when both the detector 220 of the HMD 204 and the detector 228 of the separate device 222 detect the light signal emitted by the other of the devices. This may occur when the detector 220 of the HMD 204 is within the field of view of the emitter 224 of the separate device 222 and when the detector 228 of the separate device 222 is within the field of view of the emitter 216 of the HMD 204. Thus, constraining the fields of view of the light emitted from the light emitters 216 and 224 may advantageously prevent devices outside of an intended region from detecting the light signals emitted by the emitters 216 and 224.

In some implementations, systems of the present disclosure are configured to present guidance to assist users in bringing a light detector of their device within a field of view of a light emitter of another device and/or in directing the light emitter of their device toward a light detector of another device. FIG. 3 illustrates an example of guidance provided to a user to bring optical communication components of an HMD into alignment with optical communication components of another device. In particular, FIG. 3 illustrates the operational environment 200 of FIGS. 2A through 2C from the perspective of the user 202 viewing the operational environment 200 through a display 300 of the HMD 204. FIG. 3 illustrates the separate device 222 and the light emitter 224 and light detector 228 thereof within the operational environment 200.

FIG. 3 also illustrates example guidance presentations 302 and 304 that the HMD 204 may present on the display 300 to prompt the user 202 to guide the optical components of the HMD 204 toward alignment with the optical components of the separate device 222. For example, guidance presentation 302 directs the user to look toward the light detector 228 of the separate device 222 (which may cause the light signal emitted from the light emitter 216 of the HMD 204 to reach the light detector 228) by emphasizing a region of the display 300 that depicts the light detector 228 (or through which the light detector 228 is visible). FIG. 3 illustrates this emphasis provided in the form of text accompanying a dashed circle that encompasses the representation of the light detector 228. Guidance presentation 304 directs the user to move to their left (e.g., via text and dashed chevron arrows), which may cause the second light signal emitted from the light emitter 224 of the separate device 222 to reach the light detector 220 of the HMD 204.

As the user moves the HMD 204 within the operational environment 200, the guidance presentations (e.g., guidance presentations 302 and 304) may be dynamically updated and/or changed based on sensor data obtained by the HMD 204 (e.g., simultaneous localization and mapping (SLAM) data, inertial tracking data (e.g., obtained via an inertial measurement unit), etc.). For example, once the user directs their gaze toward the detector 228, the guidance presentation 302 may be removed. As another example, if the user moves too far to their left, the guidance presentation 304 may be updated to provide new instructions to the user to move slightly to their right to compensate for their initial excessive leftward movement.

The particular guidance presentations of FIG. 3 are provided by way of example only and are not limiting of the present disclosure. One will appreciate, in view of the present disclosure, that other formats and/or types of guidance presentation for assisting users in bringing optical components of their device into alignment with optical components of another device are within the scope of the present disclosure.

After light emitters and detectors of different devices are aligned, secure communication may be performed or enabled between the different devices. Attention is directed to FIG. 2D, which also shows the operational environment 200 discussed hereinabove. FIG. 2D illustrates a light signal 218C emitted from the light emitter 216 of the HMD 204 toward the detector 228 of the separate device 222. FIG. 2D also illustrates a light signal 226C emitted from the light emitter 224 of the separate device 222 toward the light detector 220 of the HMD 204. In some instances, the light signals 218C and/or 226C are modulated according to one or more predetermined patterns or sequences to distinguish the light signals from other light that may reach the detectors 220 and 228. For example, the modulation pattern(s) or sequence(s) may be selected (or dynamically generated) based upon and/or in response to the communication initiation input (e.g., the QR code 208) discussed earlier.

In response to determining that the light detector 220 detects the light signal 226C from the light emitter 224 and that the light detector 228 detects the light signal 218C from the light emitter 216, secure communication 230 may be initiated or enabled between the HMD 204 and the separate device 222 via the light signals 218C and 226C. For example, one or more of the light signals 218C or 226C may be modulated in accordance with 802.11*bb* standards to facilitate communication between the HMD 204 and the separate device at a desired throughput (e.g., 160. Mbps, or greater or lower). As noted above, a secure element 214 associated with the HMD may be accessed as part of the interaction between the HMD 204 and the separate device. For instance, the light signal 218C from the light emitter 216 of the HMD 204 may be modulated in a manner controlled by the secure element 214 and/or in a manner that communicates information stored via the secure element 214 (e.g., payment information, security authentication information, etc.).

Thus, in contrast with existing secure inter-device communication systems (which typically rely on NFC and require centimeter or millimeter proximity of the communicating devices), implementations of the present disclosure may facilitate secure element authentication and/or communication over the air via focused optical communication. The system may disable or refrain from enabling or initiating the secure communication 230 in response to determining that the optical alignment between the devices has been broken (e.g., where the light detector 228 of the separate device 222 fails to detect the light signal 218C and/or where the light detector 220 of the HMD 204 fails to detect the light signal 226C).

In some instances, the secure communication 230 comprises a transaction or other action for which a record may be generated (e.g., a centralized or decentralized financial transaction between financial institutions or between peers). In some instances, a record of the transaction may be generated and transmitted to other systems (e.g., via internet connection). In some instances, the communicating devices (e.g., the HMD 204 and the separate device 222) are positioned in a location that lacks network or other internet access. In such instances, a record of the transaction or action may be recorded on one or more of the devices and be transmitted to other systems when network connectivity is regained.

In some instances, the secure communication 230 can include the performance of one or more actions selected by one or more users operating the communicating devices (e.g., the user 202 of the HMD 204). Such actions may implement the secure element 214 and/or information stored thereon. Systems may thus become configured to detect user intent input in association with a secure communication (e.g., whether before or after performing any of the acts discussed hereinabove with reference to FIGS. 2A through 3). Users may provide input indicative of their intended or desired actions at their device, and data communication in accordance with the intended or desired actions may be transmitted via the light signals. Users may provide input in various ways, and different input methods may exist for different devices.

Figure 4B:
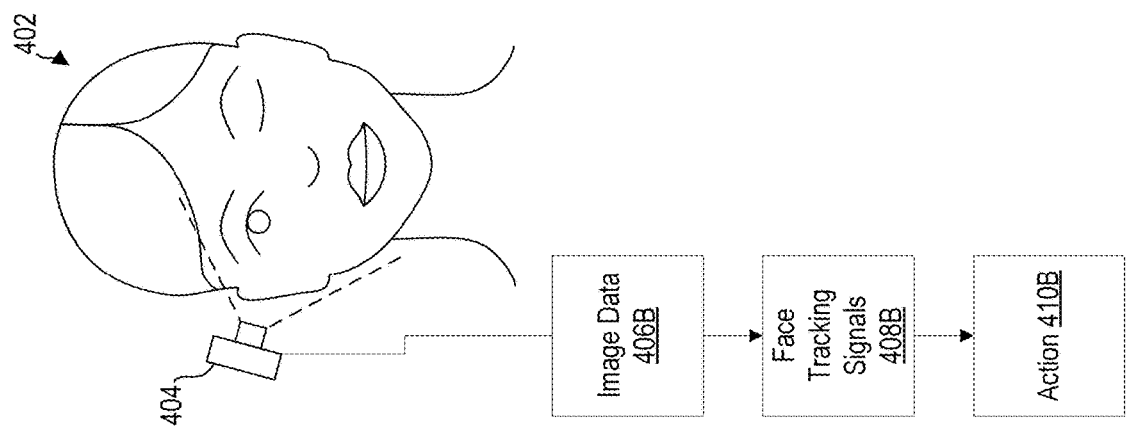
FIGS. 4A and 4B illustrate examples of different actions being associated with different user intent input.
Figure 4A:
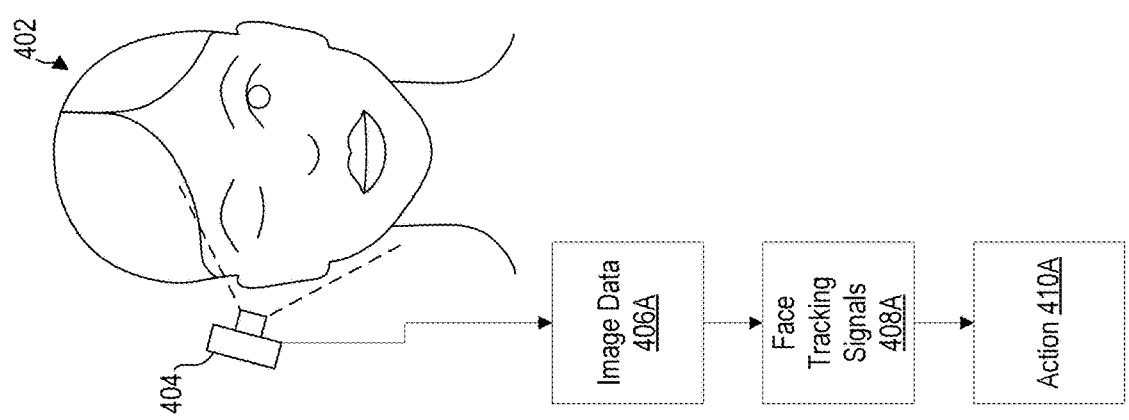

For example, FIGS. 4A and 4B illustrate examples of different user intent input that may give rise to different actions being performed via secure communication as discussed above. FIGS. 4A and 4B each depict a user 402 and an image sensor 404 directed toward the face of the user. The image sensor 404 may conceptually represent a camera of an HMD configured to capture images of a user's face and determine face tracking signals based on the images. For example, FIG. 4A illustrates the image sensor 404 capturing image data 406A depicting the face of the user 402 with the user's right eye closed. Face tracking signals 408A may be extracted from the image data 406A (e.g., position information associated with particular features or landmarks of the user's face, such as the user's eyebrows, outer inner cheeks, inner cheeks, nose, mouth, etc.), and the face tracking signals 408A may indicate that the user's right eye is closed. FIG. 4B depicts the image sensor 404 capturing image data 406B depicting the face of the user 402 with the user's left eye closed. Face tracking signals 408B may be extracted from the image data 406A, and the face tracking signals 408B may indicate that the user's left eye is closed.

Systems may be configured to perform certain actions in response to detecting certain face tracking signals. For example, FIG. 4A depicts an action 410A performed based on detecting the face tracking signals 408A (e.g., indicating that the user's right eye is closed), and FIG. 4B depicts a different action 410B performed based on detecting the face tracking signals 408B (e.g., indicating that the user's left eye is closed). The action 410A may comprise an action that the system is preconfigured to perform in response to detecting face tracking signals 408A that are associated with that action 410A, and the action 410B may comprise an action that the system is preconfigured to perform in response to detecting face tracking signals 408B that are associated with that action 410B. For example, the action 410A may comprise making a payment using a first payment method, whereas the action 410B may comprise making a payment using a second payment method. Such functionality may enable users to provide input indicating their intent in a subtle, discreet, and/or non-distracting manner, which may advantageously allow users to maintain privacy vis-à-vis their secure communications/actions/transactions.

Although at least some of the foregoing description has focused, in at least some respects, on utilizing secure element acquisition in combination with focused inter-device optical signals (e.g., LiFi) to facilitate secure communication, secure element acquisition may be combined with other wireless communication techniques in accordance with the present disclosure.

Figure 5:
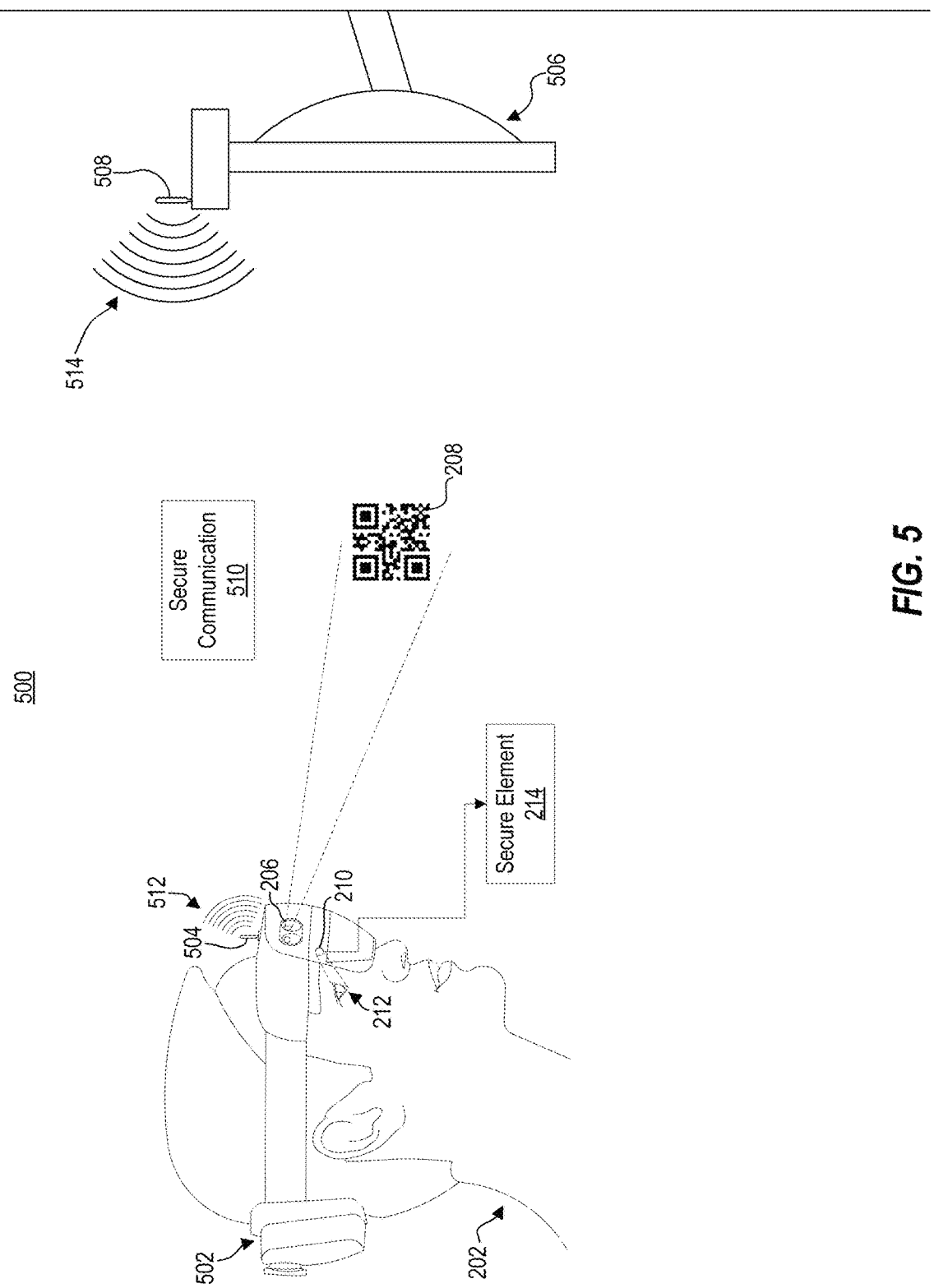
FIG. 5 illustrates an example of facilitating secure inter-device communication using iris scanning and radio-based communication.

For example, FIG. 5 illustrates an operational environment 500 in which the user 202 operates an HMD 502 to communicate with a separate device 506. Like the HMD 204 discussed hereinabove with reference to FIGS. 2A through 2D, the HMD 502 includes one or more cameras 206 for detecting communication initiation input (e.g., the QR code 208). The HMD 502 also includes an iris sensor 210 for scanning one or more of the user's eyes 212 to determine whether an authorized user (e.g., user 202) operates the HMD 502 to enable access to the secure element 214 of the HMD 502.

The HMD 502 furthermore includes a wireless communication device 504, which may, for example, comprise a radio-based communication device configured to emit radio signals (e.g., ultra-wideband (UWB), WiFi, Bluetooth, cellular, and/or others). In some instances, based upon determining that the authorized user is operating the HMD 502 (e.g., via the iris recognition for accessing the secure element 214), the HMD 204 may emit a radio signal 512 for detection by the separate device 506. The radio signal 512 may indicate that operation of the HMD 502 is performed by an authorized user, and the emission of the radio signal 512 may utilize the secure element 214 and/or information stored thereon. In some instances, the separate device 506 includes one or more wireless communication devices 508, which may emit a radio signal 514 to facilitate communication from the separate device 506 to the HMD 502. Secure communication 510 may thus be facilitated between the HMD 502 and the separate device 506.

Figure 6:
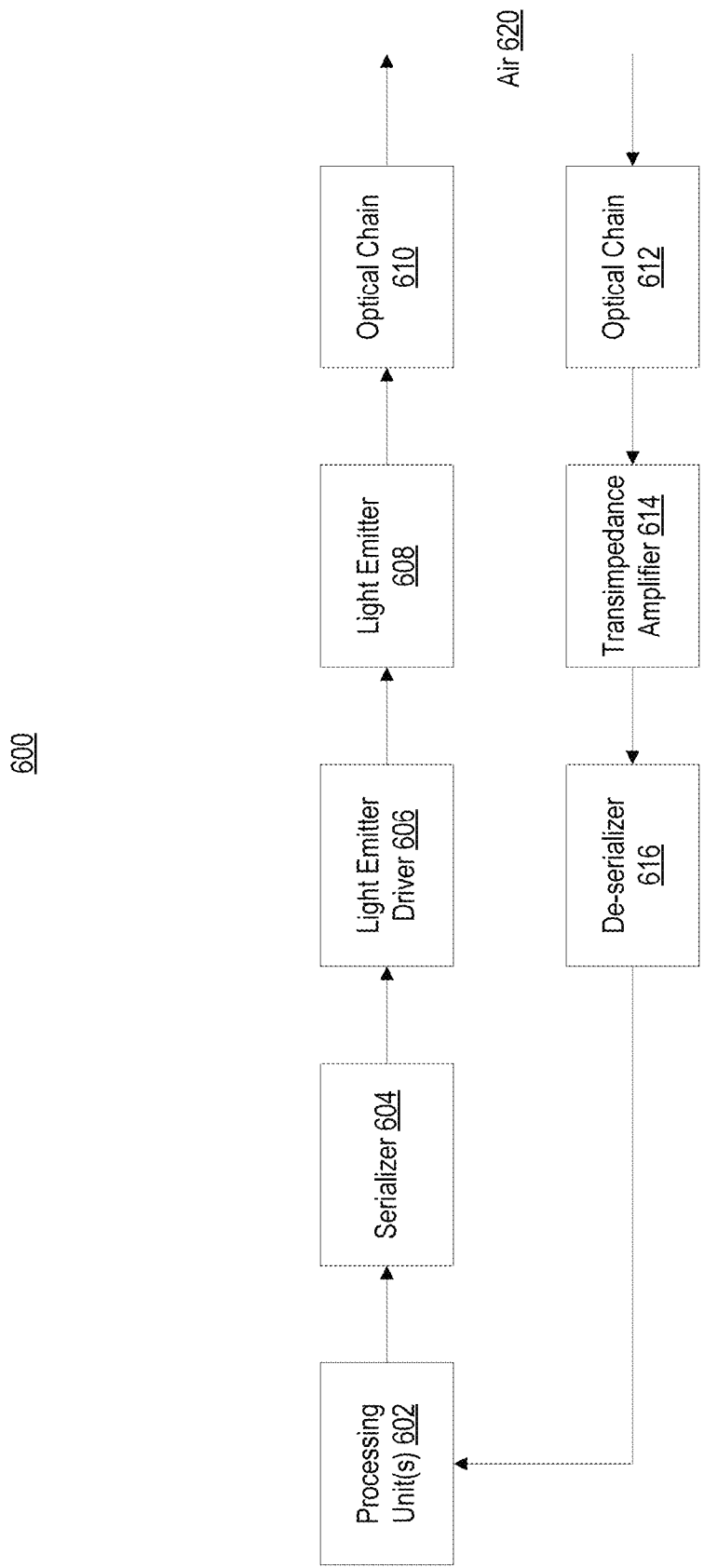
FIG. 6 illustrates example optical components for facilitating secure communication between devices.

FIG. 6 illustrates example components of a communication device 600 for facilitating secure optical over the air communication between devices. One or more of the components discussed in FIG. 6 may be implemented, for instance, into a mobile device, an HMD, a dongle that is selectively connectable to a user device (e.g., dongle 124).

FIG. 6 illustrates that the communication device 600 may comprise processing unit(s) 602, which may conceptually correspond to the processor(s) 102 discussed hereinabove with reference to FIG. 1. The processing unit(s) 602 may comprise one or more dedicated low-power always-on processing units. The processing unit(s) 602 may facilitate control of and/or communication with various components of the communication device 600 (e.g., the serializer 604 and/or the de-serializer 616, as shown in FIG. 6). For example, the processing unit(s) 602 may be configured to communicate with a secure element of a device and/or other secure communication hardware of a device, such as to obtain information for generating a light signal that communicates utilizing the secure element and/or other hardware (e.g., dynamic security codes) and/or conveys information stored on a secure element.

FIG. 6 shows that the communication device 600 may comprise a serializer 604, which may be configured to serialize input data provided via the processing unit(s) 602 (e.g., utilizing 4 display serial interface lanes for throughput of about 800. Mbps), thereby generating serialized data that is usable to drive a light emitter driver 606 to generate an appropriate output light signal (e.g., one that conveys secure communication information, such as payment, security authentication, or other secure information stored on a secure element).

Based on the serialized data received form the serializer 604, the light emitter driver 606 may drive the light emitter 608 (e.g., a VCSEL, LED, laser, etc.). The light emitter 608 may emit the output light signal, which may be transmitted through an optical chain 610, which may comprise one or more optical elements, such as a double lens to facilitate light collimation according to a predefined field of view (e.g., 60 degrees). As noted above, the imposition of the predefined field of view may operate as a constraint to prevent devices outside of the field of view from detecting the output light directed via the optical chain 610.

The output light signal transmitting through the optical chain 610 may travel through the air 620 to reach light signal detection elements of another device, thereby facilitating communication from the communication device 600 and another device.

In some implementations, the communication device is additionally configured to receive light signals from other devices. For example, the communication device 600 of FIG. 6 includes an optical chain 612, which may comprise one or more optical elements (e.g., filters, lenses) configured to receive light communication signals emitted from other devices. The optical chain 612 may direct the received light communication signals to one or more photodiodes to generate an input current, and the input current may be converted to a voltage (e.g., a digital signal) via a transimpedance amplifier 614. The voltage signal generated via the transimpedance amplifier 614 may be de-serialized via a de-serializer 616, and the information conveyed thereby may be utilized by various components of the communication device and/or with which the communication device is connected (e.g., via the processing unit(s) 602). For instance, a presentation based on conveyed information may be displayed on a display of a receiving system, or a receiving system may initiate one or more actions or transactions based on the conveyed information (e.g., payment transactions, granting access based on received security authentication information, etc.).

Although FIG. 6 illustrates the communication device 600 as including components for both outputting a light communication signal and receiving a light communication signal, it will be appreciated, in view of the present disclosure, that a communication device may omit components for outputting a light communication signal or components for receiving a light communication signal.

As noted above, the components discussed with reference to FIG. 6 may be operated in combination with one another with low power (for instance, in one example implementation, with a measured power about 90 mW to about 100 mW and with peak of about 160 mW or less).

Example Method(s) for Secure Over the Air Optical Communication

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
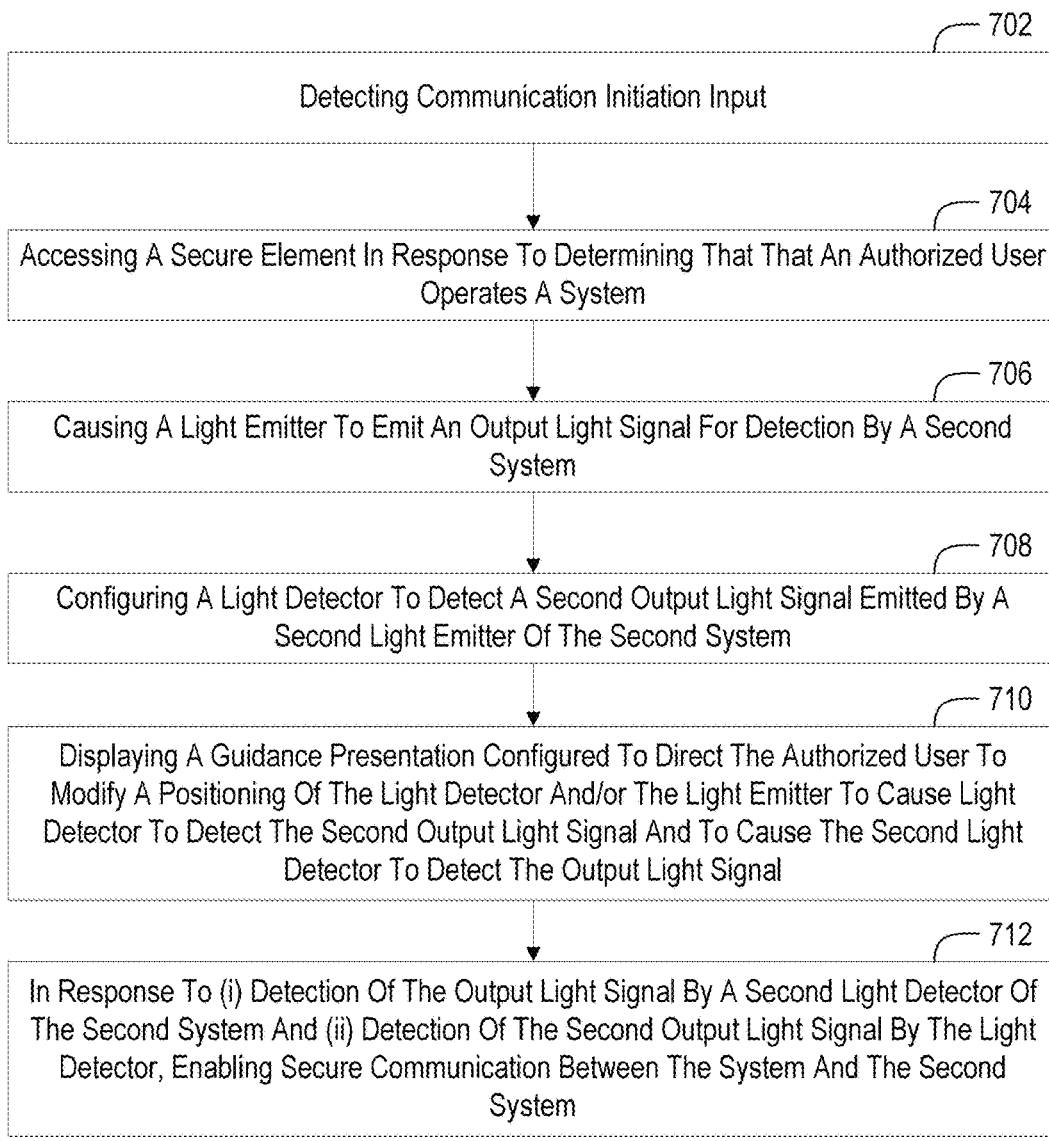
FIGS. 7 and 8 illustrate flow diagrams depicting acts associated with facilitating secure communications between devices.
Figure 8:
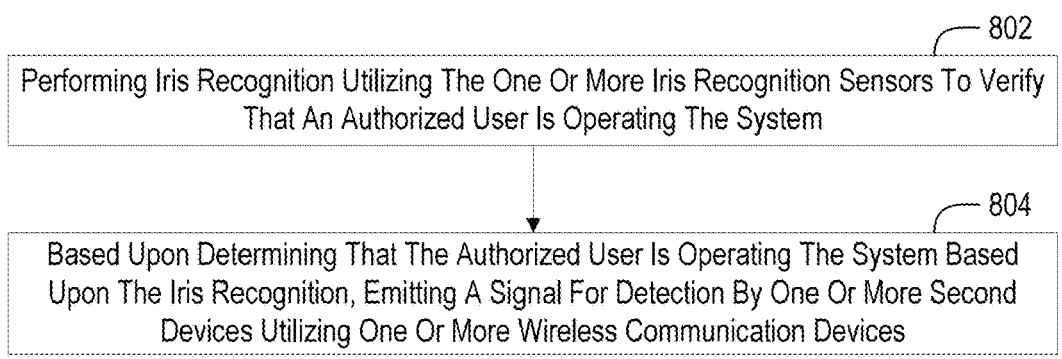

FIGS. 7 and 8 illustrate flow diagrams 700 and 800, respectively, depicting acts associated with facilitating secure communications between devices. The discussion of the various acts represented in the flow diagrams include references to various hardware components described in more detail with reference to FIG. 1.

Act 702 of flow diagram 700 of FIG. 7 includes detecting communication initiation input. Act 702 is performed, in some instances, by a system 100 utilizing processor(s) 102, storage 104, sensor(s) 110, I/O system(s) 114, communication system(s) 116, and/or other components. The communication initiation input may take on various forms, such as provision of explicit user input (e.g., touch, gesture, voice, gaze input, etc.) and/or scanning of a scannable element (e.g., a QR code, barcode, icon, etc.).

Act 704 of flow diagram 700 includes accessing a secure element in response to determining that that an authorized user operates a system. Act 704 is performed, in some instances, by a system 100 utilizing processor(s) 102, storage 104, sensor(s) 110, secure communication hardware 112, I/O system(s) 114, communication system(s) 116, and/or other components. In some instances, determining that an authorized user operates the system includes performing iris recognition to verify that the authorized user is operating the system. Other methods for determining that an authorized user is operating the system may include fingerprint scanning, facial recognition, password/pin entry, and/or others.

Act 706 of flow diagram 700 includes causing a light emitter to emit an output light signal for detection by a second system. Act 706 is performed, in some instances, by a system 100 utilizing processor(s) 102, storage 104, I/O system(s) 114, communication system(s) 116, light emitter 120, and/or other components. In some instances, the output light signal is emitted according to a predefined field of view, which may operate as a constraint to prevent devices outside of the field of view from detecting the output light signal. In some instances, act 706 is performed after and/or in response to performance of act 702 or act 704.

Act 708 of flow diagram 700 includes configuring a light detector to detect a second output light signal emitted by a second light emitter of the second system. Act 708 is performed, in some instances, by a system 100 utilizing processor(s) 102, storage 104, I/O system(s) 114, communication system(s) 116, light detector 122, and/or other components. In some instances, the second output light signal is emitted by the second device according to a second predefined field of view, which may operate as a second constraint to prevent devices outside of the second field of view from detecting the second output light signal. In some instances, the second device comprises an HMD, whereas, in some instances, the HMD comprises another type of device (e.g., a terminal or kiosk, a smartphone, a tablet, a laptop, a smartwatch, etc.).

Act 710 of flow diagram 700 includes displaying a guidance presentation configured to direct the authorized user to modify a positioning of the light detector and/or the light emitter to cause light detector to detect the second output light signal and to cause the second light detector to detect the output light signal. Act 710 is performed, in some instances, by a system 100 utilizing processor(s) 102, storage 104, sensor(s) 110, I/O system(s) 114, communication system(s) 116, light emitter 120, light detector 122, and/or other components. In some implementations, the guidance presentation is updated based on sensor data (e.g., IMU data, SLAM data, etc.).

Act 712 of flow diagram 700 includes, in response to (i) detection of the output light signal by a second light detector of the second system and (ii) detection of the second output light signal by the light detector, enabling secure communication between the system and the second system. Act 712 is performed, in some instances, by a system 100 utilizing processor(s) 102, storage 104, sensor(s) 110, I/O system(s) 114, communication system(s) 116, light emitter 120, light detector 122, and/or other components. In some instances, the secure communication utilizes the secure element and/or information stored via the secure element. In some instances, secure communication is prevented or refrained from becoming or remaining enabled in response to detecting that (i) the second light detector of the second system fails to detect the output light signal or (ii) the light detector fails to detect the second output light signal. The secure communication may implement 802.11$bb$ or other standards. In some instances, the secure communication may comprise performing one or more actions based upon detected user intent input. Such actions may utilize the secure element or information stored via the secure element (e.g., payment actions, security authentication actions, etc.). In some instances, an action record detailing the performed action is generated/stored on one or more hardware storage devices.

Act 802 of flow diagram 800 of FIG. 8 includes performing iris recognition utilizing the one or more iris recognition sensors to verify that an authorized user is operating the system. Act 802 is performed, in some instances, by a system 100 utilizing processor(s) 102, storage 104, sensor(s) 110, I/O system(s) 114, communication system(s) 116, and/or other components.

Act 804 of flow diagram 800 includes based upon determining that the authorized user is operating the system based upon the iris recognition, emitting a signal for detection by one or more second devices utilizing one or more wireless communication devices. Act 804 is performed, in some instances, by a system 100 utilizing processor(s) 102, sensor(s) 110, storage 104, I/O system(s) 114, communication system(s) 116, light emitter 120, light detector 122, and/or other components. In some instances, the one or more wireless communication devices comprise one or more radio devices, and the signal comprises a radio signal (e.g., a UWB, WiFi, cellular, or other type of signal). In some instances, the one or more wireless communication devices comprise one or more LiFi devices, and the signal comprises a light signal. In some instances, the emitted signal may utilize a secure element and/or information stored via a secure element.

Additional Details Related to Implementing the Disclosed Embodiments

The principles disclosed herein may be implemented in various formats. For example, the various techniques discussed herein may be performed as a method that includes various acts for achieving particular results or benefits. In some instances, the techniques discussed herein are represented in computer-executable instructions that may be stored on one or more hardware storage devices. The computer-executable instructions may be executable by one or more processors to carry out (or to configure a system to carry out) the disclosed techniques. In some embodiments, a system may be configured to send the computer-executable instructions to a remote device to configure the remote device for carrying out the disclosed techniques.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system configured to facilitate secure communications, the system comprising:
    a light emitter;
    a light detector;
    a secure element configured for storage of sensitive data;
    one or more processors; and
    one or more hardware storage devices storing instructions that are executable by the one or more processors to configure the system to:
        determine whether an authorized user operates the system;
        access the sensitive data via the secure element of the system in response to the system determining that the authorized user operates the system;
        cause the light emitter to emit an output light signal for detection by a second system, the output light signal being emitted according to a predefined field of view, the predefined field of view operating as a constraint to prevent devices outside of the field of view from detecting the output light signal;
        configure the light detector to detect a second output light signal emitted by a second light emitter of the second system; and
        in response to (i) detection of the output light signal by a second light detector of the second system and (ii) detection of the second output light signal by the light detector, enable secure communication between the system and the second system that uses the sensitive data accessed via the secure element.

2. The system of claim 1, wherein determining that an authorized user operates the system comprises performing iris recognition to verify that the authorized user is operating the system.

3. The system of claim 1, wherein the system is configured to refrain from enabling secure communication between the system and the second system in response to detecting that (i) the second light detector of the second system fails to detect the output light signal or (ii) the light detector fails to detect the second output light signal.

4. The system of claim 1, wherein the second output light signal is emitted by the second device according to a second predefined field of view, the second predefined field of view operating as a second constraint to prevent devices outside of the second field of view from detecting the second output light signal.

5. The system of claim 1, wherein the output light signal comprises 850 nm infrared light.

6. The system of claim 1, wherein the instructions are executable by the one or more processors to further configure the system to:
    display a guidance presentation configured to direct the authorized user to modify a positioning of the light detector and/or the light emitter to cause light detector to detect the second output light signal and to cause the second light detector to detect the output light signal.

7. The system of claim 6, wherein the guidance presentation is updated based on sensor data associated with the system.

8. The system of claim 1, wherein the secure communication between the system and the second system is enabled utilizing 802.11bb standards.

9. The system of claim 1, wherein enabling secure communication between the system and the second system comprises:
    configuring the system to detect user intent input; and
    performing an action based on the user intent input.

10. The system of claim 9, wherein the user intent input comprises one or more face tracking signals.

11. The system of claim 9, wherein the action utilizes the sensitive data stored via the secure element.

12. The system of claim 9, wherein the secure communication comprises storing an action record on the one or more hardware storage devices, the action record comprising one or more details related to the action performed based on the user intent input.

13. The system of claim 1, wherein:
    the instructions are executable by the one or more processors to configure the system to detect communication initiation input, and
    the system causes the light emitter to emit the output light signal and configures the light detector to detect the second output signal in response to detecting the communication initiation input.

14. The system of claim 1, wherein the system comprises an HMD, and wherein the second system is not an HMD.

15. A system configured to facilitate secure communications, the system comprising:
    a light emitter;
    a light detector;
    one or more processors; and
    one or more hardware storage devices storing instructions that are executable by the one or more processors to configure the system to:
        access a secure element in response to determining that an authorized user operates the system;

cause the light emitter to emit an output light signal for detection by a second system, the output light signal being emitted according to a predefined field of view, the predefined field of view operating as a constraint to prevent devices outside of the field of view from detecting the output light signal;

configure the light detector to detect a second output light signal emitted by a second light emitter of the second system; and in response to (i) detection of the output light signal by a second light detector of the second system and (ii) detection of the second output light signal by the light detector, enable secure communication between the system and the second system, wherein enabling secure communication between the system and the second system comprises:

configuring the system to detect user intent input; and performing an action based on the user intent input.

\* \* \* \* \*